(12) United States Patent
Chen

(10) Patent No.: US 8,763,044 B2
(45) Date of Patent: Jun. 24, 2014

(54) METHOD, APPARATUS, AND SYSTEM FOR PREPARING IMAGES FOR INTEGRATION AND COMBINING IMAGES INTO AN INTEGRATED IMAGE

(75) Inventor: Michael Chen, Wallingsford, PA (US)

(73) Assignee: Concurrent Computer Corporation, Duluth, GA (US)

( * ) Notice: Subject to any disclaimer, the term of this patent is extended or adjusted under 35 U.S.C. 154(b) by 3030 days.

(21) Appl. No.: 10/685,354

(22) Filed: Oct. 10, 2003

(65) Prior Publication Data

US 2005/0081241 A1    Apr. 14, 2005

(51) Int. Cl.
*H04N 5/445* (2011.01)
*H04N 9/74* (2006.01)

(52) U.S. Cl.
USPC ............... 725/41; 725/43; 348/584; 348/598

(58) Field of Classification Search
USPC ........... 725/39, 40, 41, 43, 45, 51, 54, 37, 38, 725/42, 114, 138, 144, 32; 348/563, 578, 348/584, 598, 588–589; 375/240.09, 240.1, 375/240.25, 240.26
See application file for complete search history.

(56) References Cited

U.S. PATENT DOCUMENTS

| | | | | |
|---|---|---|---|---|
| 5,321,750 A | * | 6/1994 | Nadan | 380/230 |
| 5,487,143 A | * | 1/1996 | Southgate | 715/790 |
| 5,751,282 A | | 5/1998 | Girard et al. | |
| 5,812,123 A | | 9/1998 | Rowe et al. | |
| 5,815,145 A | | 9/1998 | Matthews, III | 345/327 |
| 5,907,323 A | | 5/1999 | Lawler et al. | 345/327 |
| 6,034,677 A | * | 3/2000 | Noguchi et al. | 715/719 |
| 6,141,442 A | * | 10/2000 | Chen | 382/166 |
| 6,147,714 A | * | 11/2000 | Terasawa et al. | 348/564 |
| 6,177,931 B1 | | 1/2001 | Alexander et al. | 345/327 |
| 6,201,536 B1 | | 3/2001 | Hendricks et al. | |
| 6,262,724 B1 | * | 7/2001 | Crow et al. | 715/723 |
| 6,389,075 B2 | | 5/2002 | Wang et al. | |
| 6,415,437 B1 | | 7/2002 | Ludvig et al. | |
| 6,481,012 B1 | | 11/2002 | Gordon | |
| 6,493,038 B1 | * | 12/2002 | Singh et al. | 348/565 |
| 6,573,913 B1 | * | 6/2003 | Butler et al. | 715/761 |
| 6,732,370 B1 | * | 5/2004 | Gordon et al. | 725/39 |
| 7,091,968 B1 | * | 8/2006 | Ludvig et al. | 725/39 |
| 7,440,674 B2 | * | 10/2008 | Plotnick et al. | 386/343 |
| 7,634,788 B2 | * | 12/2009 | Gordon et al. | 725/41 |
| 2002/0078440 A1 | * | 6/2002 | Feinberg et al. | 725/9 |
| 2002/0184628 A1 | | 12/2002 | Kim | |
| 2003/0005429 A1 | | 1/2003 | Colsey | |
| 2003/0028879 A1 | * | 2/2003 | Gordon et al. | 725/39 |
| 2003/0159143 A1 | * | 8/2003 | Chan | 725/41 |
| 2004/0150751 A1 | * | 8/2004 | Phillips et al. | 348/565 |
| 2006/0156336 A1 | | 7/2006 | Knudson et al. | 725/39 |

FOREIGN PATENT DOCUMENTS

WO    WO-00/78049    12/2000

* cited by examiner

*Primary Examiner* — Benjamin R Bruckart
*Assistant Examiner* — Jason Thomas
(74) *Attorney, Agent, or Firm* — Philip H. Burrus, IV

(57) ABSTRACT

At least a first image, such as a motion video image, is prepared for integration with at least a second image, such as a motion video image and/or a still image. To prepare the first image for integration, a first compressed image is formed, restricted to a first region of a first image area by representing at least one segment of a first image within the first region with a reference to another segment of the first image within the first region. The second image may also be prepared for integration by forming a second compressed image. The second compressed image may be restricted to a second region of a second image area by representing at least one segment of the second image within the second region with a reference to another segment of the second image within the second region.

64 Claims, 9 Drawing Sheets

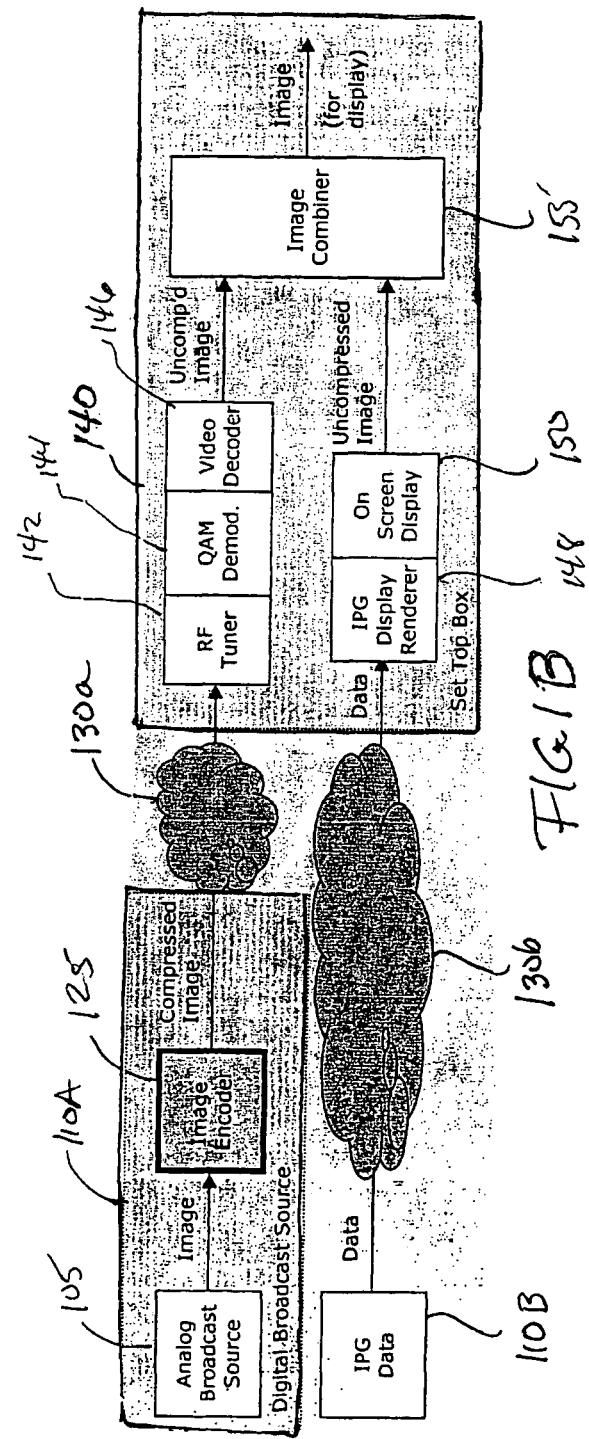

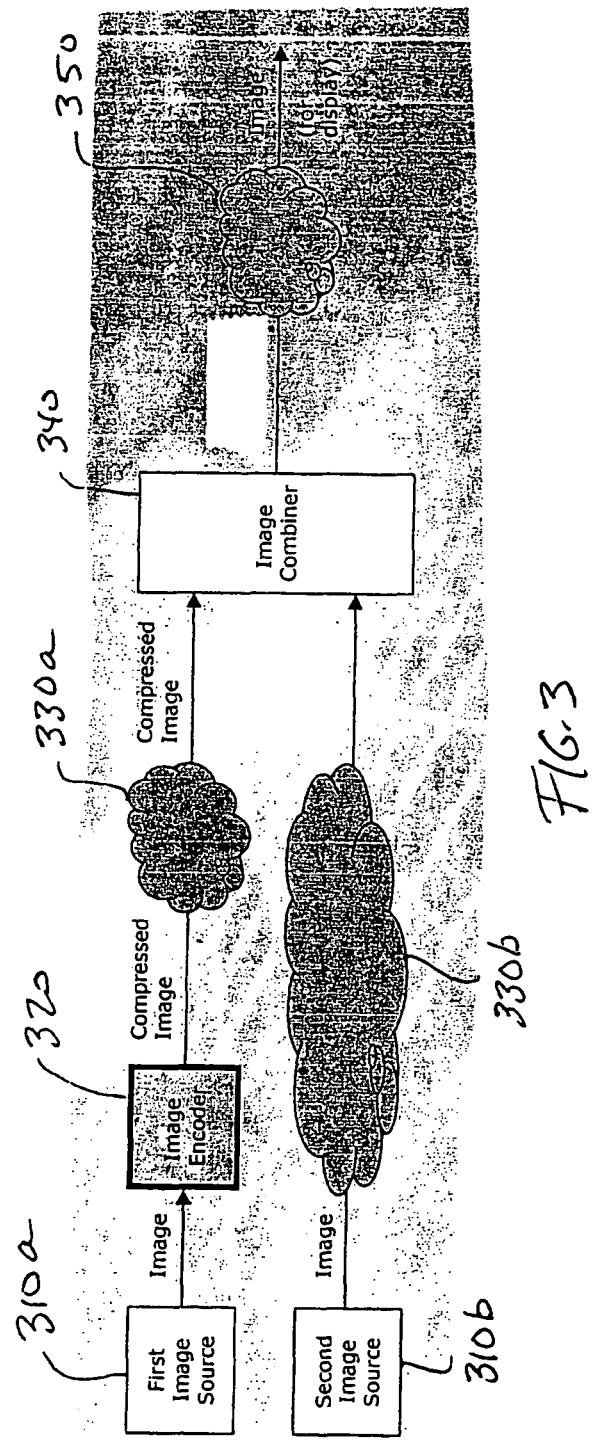

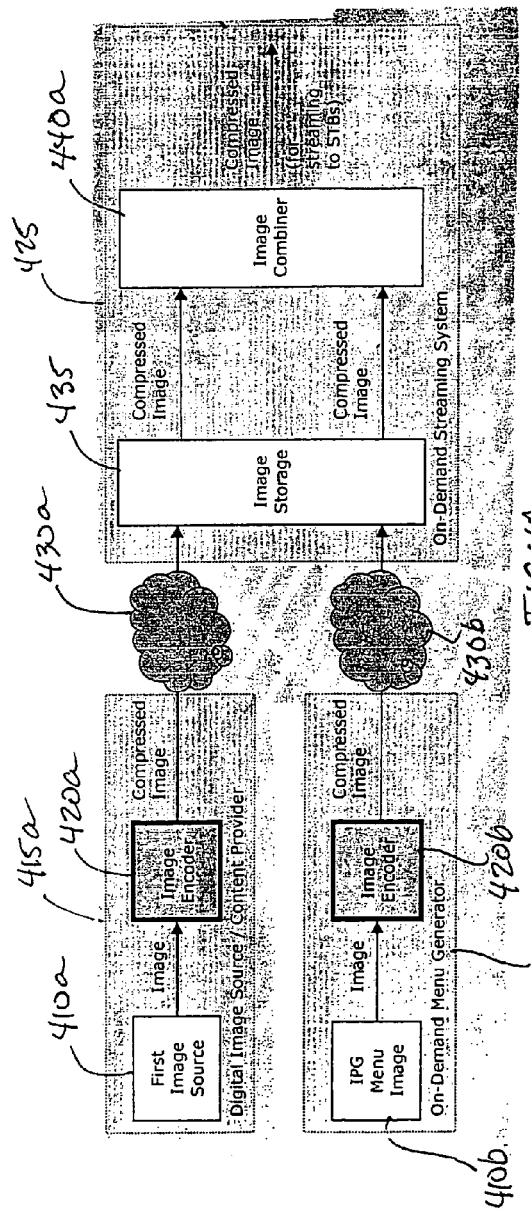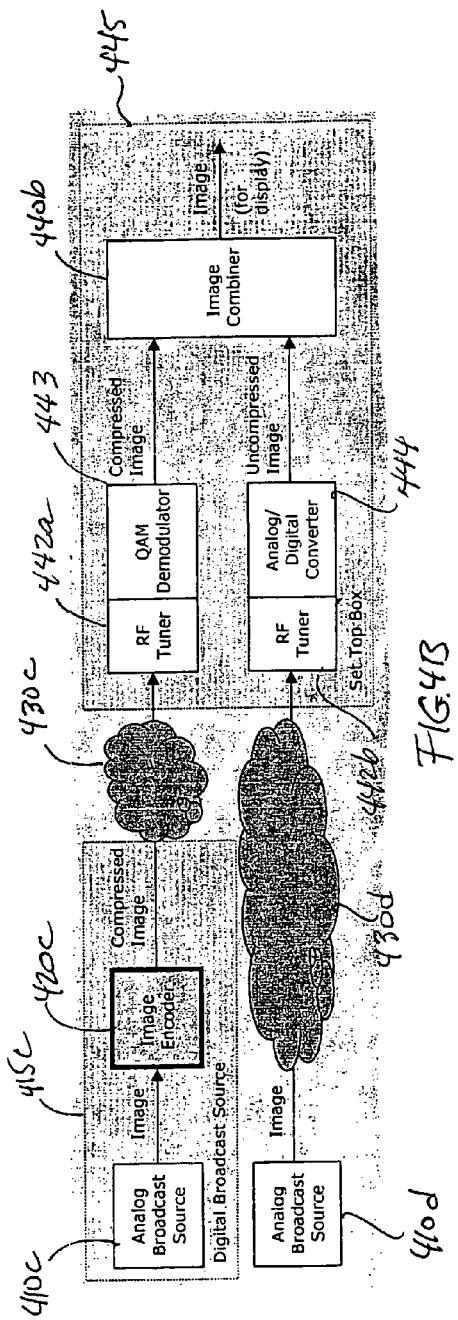

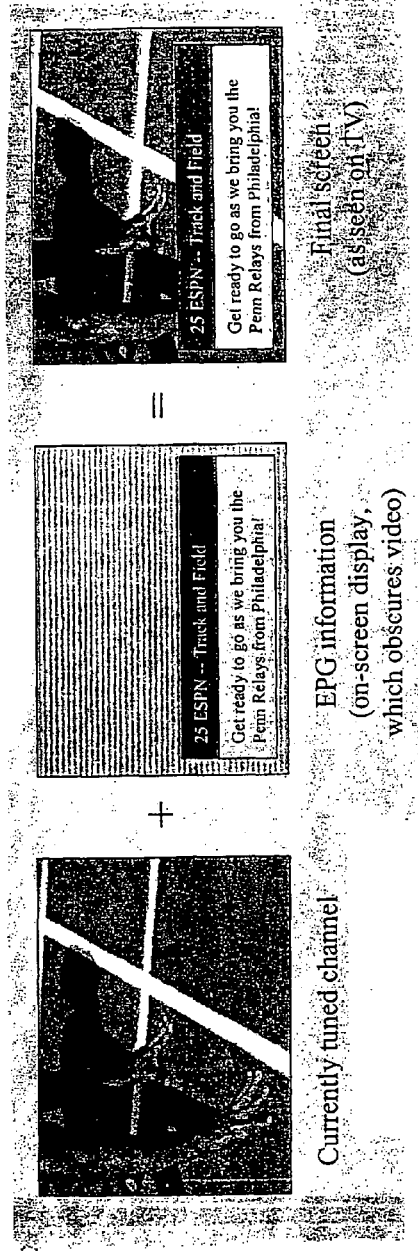
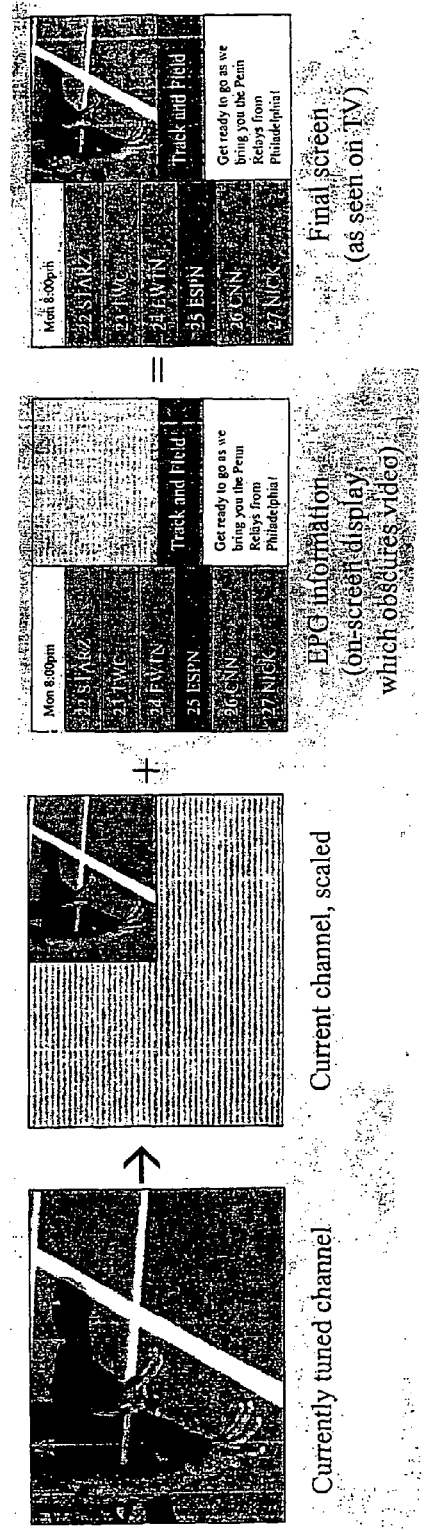
FIG. 6A
FIG. 6B

METHOD, APPARATUS, AND SYSTEM FOR PREPARING IMAGES FOR INTEGRATION AND COMBINING IMAGES INTO AN INTEGRATED IMAGE

BACKGROUND

The present invention is directed to a method, apparatus, and system for preparing images for integration and combining images into an integrated image. More particularly, the present invention is directed to a method, apparatus, and system for compressing images in preparation for integration and combining the compressed images into an integrated image for display.

Short video clips, or barkers, advertising specific video content are common in the entertainment industry. For example, before a feature presentation, "movie watchers" see a myriad of movie previews, or barkers, that highlight particularly enjoyable parts of the advertised movie. The barkers used in this manner are intended to entice the viewers to choose to view advertised content.

Like the film industry, the broadcast television industry has also used barkers for advertising. In this environment, programmers send the barker to all viewers "tuned in" to a particular station. Hopefully, the barker will entice television viewers to view the advertised video.

Because of the effectiveness of barkers in both the film industry and broadcast television industry, they have become particularly appealing in the digital television industry.

Digital television networks enable two-way communication so that a subscriber can interact or "request" information from the network equipment. Typically, a menu—also called an interactive program guide (IPG) or electronic program guide (EPG)—is employed to list the content available for viewing. The IPG application enables a viewer to browse listings of available programming and associated information and to select content for viewing. The subscriber can utilize the menu to request additional information regarding the offerings.

Typically, the menu has a numeric listing by channel of broadcast television programming. Additionally, a subscriber may have access to narrowcast applications.

Narrowcast programming is point-to-point streaming of video from a storage point in the network to a specific subscriber. Narrowcast applications are made possible by compression techniques, e.g., the standards developed by the Moving Picture Experts Group (MPEG), that enable more content to be delivered to viewers with little or no degradation in picture quality. The resulting increase in transmission capacity allows narrowcast programming to be placed alongside broadcast programming for delivery to viewers.

A dominant narrowcast application is the delivery of content on demand (COD). This content may span many categories, including movies on demand (MOD), video on demand (VOD), subscription video on demand (SVOD), free on demand (FOD) and network-based digital video recording (NDVR).

The user experience provided by an IPG is critical to the success of narrowcast services, since the IPG controls access to the library of narrowcast content available to viewers. Typically, the IPG presents the subscriber with COD menus that usually begin with a general description of the offerings, from which the subscriber can drill-down to specific content to be viewed. The ability to deliver narrowcast content to viewers creates the opportunity to provide a targeted IPG, which allows advertisement and promotional content to be selected for and delivered to each viewer. This ability can greatly improve both the user experience of an IPG and the success of narrowcast services such as COD.

In this menuing environment, it is desirable to play barkers to entice the subscriber to watch a particular movie. If COD is available, the subscriber can order the content and watch it on his/her television. (Otherwise, the subscriber would need to rent, purchase, of view the movie from another source.)

In order for a barker to be viewed on a television set, it must be compressed by an encoder within the digital television network, transmitted to the subscriber's set-top box (STB) via the network, decompressed by a decoder within the STB, and rendered on the television. Typically, the first step, compressing the barker, is performed prior to distribution by the digital television network. Thus, the barker is typically maintained within the network servers in a compressed format.

Barkers generally contain full-screen images because video compressors accept and output only full-screen images. Because barkers are "full video" images, displaying barkers in a digital network along with the appropriate menu(s) can be particularly challenging. At some point, the barker must be scaled and properly positioned within the menu without losing resolution. In addition, this scaling and repositioning must be done in a manner that is not cost prohibitive, while remaining commercially viable. Many conventional STBs, such as the DCT 2000, have no video scaling capabilities. Even those STBs that are capable of scaling video do not have the capability to scale and reposition barkers effectively and efficiently.

There is thus a need for a technique and device for preparing images for integration and combining such images effectively and efficiently. Ideally, such integration will result in an image which may be displayed by an STB as an Advanced Menu or motion video integrated with at least one other motion video, such as a barker.

SUMMARY

According to an exemplary embodiment, a method, apparatus and system are provided for preparing at least a first image, such as a motion video image, for integration with at least a second image, such as a motion video image and/or a still image.

According to exemplary embodiments, a first compressed image is formed, restricted to a first region of a first image area. The first compressed image is formed by representing at least one segment of the first image within the first region with a reference to another segment of the first image within the first region, thereby preparing the first image for integration with at least the second image.

According to exemplary embodiments, the second image may also be prepared for integration with the first image by forming a second compressed image, restricted to a second region of a second image area. The second compressed image is formed by representing at least one segment of the second image within the second region with a reference to another segment of the second image within the second region.

According to one embodiment, the first image area and the second image area are the same, and the first region and the second region are different regions within the same image area.

According to another embodiment, the first image area and the second image area are different, and the first region and the second region are different regions within different image areas.

According to exemplary embodiments, the first image area spans at least one frame. In one embodiment, the first compressed image is formed by representing at least one segment of the first image within the first region of a frame with a reference to another segment of the first image within the first region of the same frame. In another embodiment, the first compressed image is formed by representing at least one segment of the first image within the first region of a frame with a reference to a segment of the first image within the first region of a different frame.

According to exemplary embodiments, the second image spans at least one frame. In one embodiment, the second compressed image is formed by representing at least one segment of the second image within the second region of a frame with a reference to another segment of the second image within the second region of the same frame. In another embodiment, the second compressed image is formed by representing at least one segment of the second image within the second region of a frame with a reference to a segment of the second image within the second region of a different frame.

According to exemplary embodiments, the first compressed image and the second compressed image are combined. First portions of the first compressed image within the first region of the first image area are selected, and second portions of the second compressed image within the second region of the second image area are selected. The selected first portions and second portions are combined to form an integrated image.

The objects, advantages and features of the present invention will become more apparent when reference is made to the following description taken in conjunction with the accompanying drawings.

BRIEF DESCRIPTION OF THE DRAWINGS

FIG. 1B illustrates detailed components of a conventional digital television system;

FIG. 3 illustrates an exemplary system in which the invention may be implemented;

FIGS. 4A and 4B illustrate in detail systems in which the invention may be implemented according to exemplary embodiments;

FIGS. 6A and 6B illustrate exemplary integrated images prepared and formed according to exemplary embodiments.

DETAILED DESCRIPTION

As noted above, there are difficulties associated with integrating images for delivery and display in an environment, such as a COD environment. In particular, in a digital television environment, the capabilities for integrating images, such as a barker within a menu, are limited. To understand the limitations of integrating images in such an environment, it is useful to analyze how digital television works.

Figure 1A:
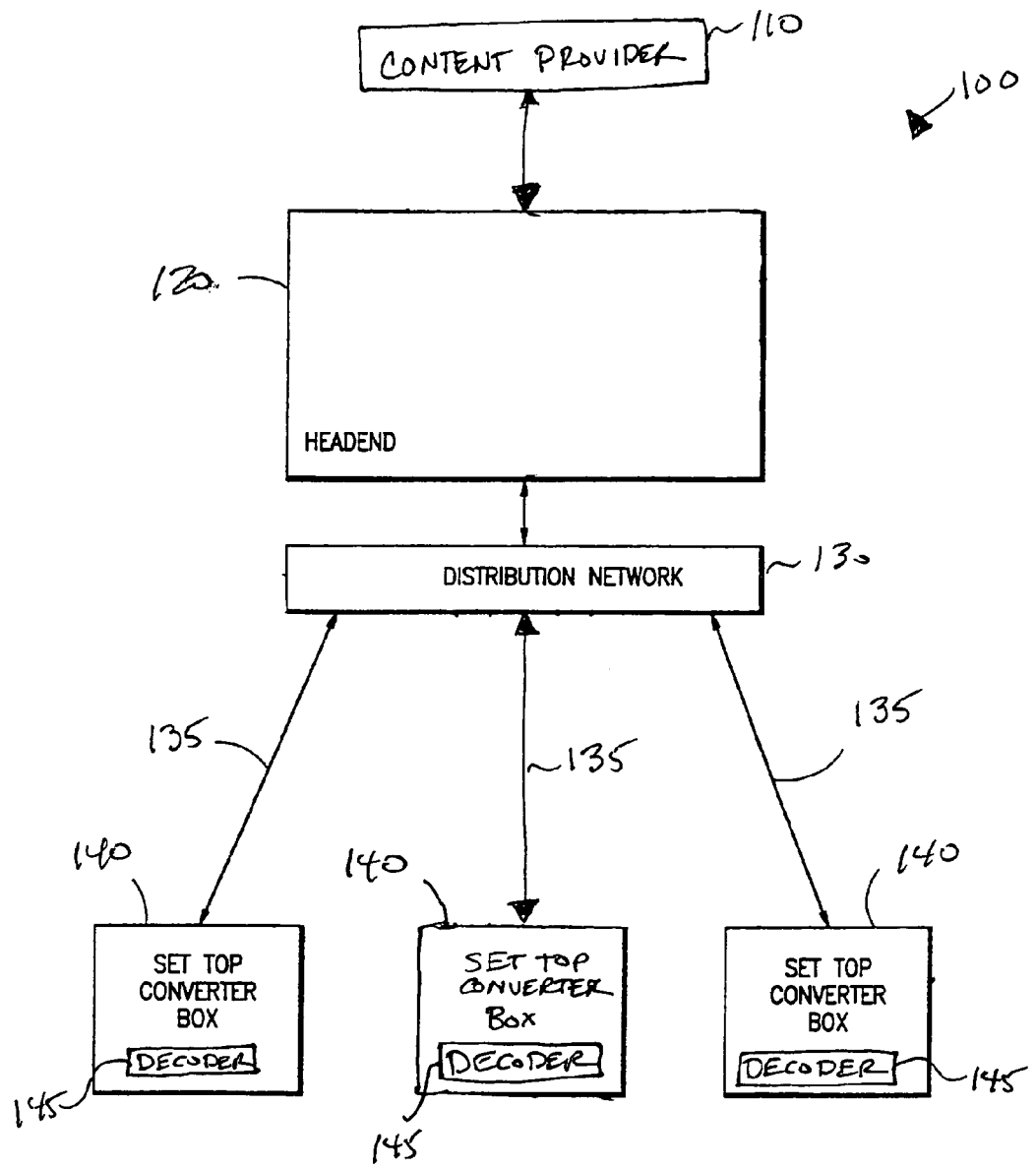
FIG. 1A illustrates an exemplary content on demand delivery system.

FIG. 1A illustrates an exemplary digital television system. For digital television presentation, the original audio and video content is retrieved from a content provider 110 and converted from analog into digital format if necessary. The digital audio and video data is compressed (encoded) in an encoder typically included within the content provider 110. Compression is achieved using algorithms, such as, MPEG-2 or MPEG 4 for video and Dolby Digital for audio. The resulting compressed data is then transmitted to the cable head end 120 via, e.g., a satellite link, optical fiber, or other appropriate connection. The cable head end 120 processes (e.g., modulates and multiplexes) the transport stream into a form suitable for transmission to STBs 140 via a distribution network 130 and RF cable connections 135. An STB 140 demultiplexes the received content to recover the compressed data and decodes and decompresses (decodes) the received data in a decoder 145 to produce the digital audio and video data. The digital audio and video data is converted to analog format if necessary and presented to the user, typically on a television connected to the STB 140.

The following description focuses on processing of video content. Audio content accompanying the video content may be processed in any desired manner, using conventional techniques or techniques adapted from those described below for video processing.

Menus are typically generated for digital television in two specific manners. The menu may be rendered by the STB, using on-screen-display (OSD) hardware within the STB, or the menu may be prepared as a still image by a server within the digital television network and sent to the STB.

In order to present a barker within an OSD menu (for example in the upper right quadrant), the barker must be scaled to the appropriate size (perhaps 25% of its full size) and moved to a position on the screen (the top right corner) so the rest of the screen can be filled with menu. For an STB having scaling/repositioning capabilities, the barker can be streamed to the STB and scaled and moved to the correct location by the STB. Then, the STB can overwrite the portions of the screen unoccupied by the barker, utilizing the OSD hardware.

FIG. 1B illustrates a conventional digital television system including an STB that contains OSD hardware and is capable of scaling/repositioning. The system includes a content provider 110A in which an analog audio/video signal is generated by an analog broadcast source 105 (e.g., an analog video tape recorder or analog camera). The analog signal is converted into digital form, either in the encoder 125 or in a separate A/D converter, and then compressed in the encoder 125.

Although not illustrated, it will be appreciated that if the original signal was from a digital source, such as a digital Betacam video tape recorder, it would be encoded by the encoder 125 without A/D conversion. If the original signal was digital and compressed, it could be sent out by the content provider 110a without encoding as long as other properties, such as bit rate, were appropriate. In many cases, such a signal has a much higher bit rate than is desirable for broadcast, in order to preserve the original image quality. In these types of cases, the digital compressed signal would first be decoded in a video decoder and then output as uncompressed digital video to the encoder 125.

The compressed digital signal output from the encoder 125 is processed and delivered via a delivery network 130a (including, e.g., a cable head end, a distribution network, and RF cable connections) to the STB 140 at a particular frequency along with other signals sharing the same frequency. Also, signals representing each of the available channels (analog and digital, narrowcast and broadcast) are sent at different frequencies to the STB 140 via the delivery network 130a. Similarly, IPG data generated in an IPG generator 110b is delivered via a distribution network 130b (which may be the same as or different from the network 130a) to the STB 140.

In the STB 140, the RF tuner 142 selects the appropriate frequency of the compressed digital signal, and the QAM demodulator 144 recovers the compressed digital signal. The compressed signal is then decompressed in a video decoder 146. Although not shown, it will be appreciated that there may be additional hardware, such as a demultiplexer, between the demodulator 144 and the decoder 146 for selecting the video portion of the appropriate program from the collection of programs which share the same frequency selected by the RF tuner. From the selected video portion, the video decoder 146 can reconstruct the digital uncompressed image.

The received IPG data is also processed in the STB 140, e.g., rendered by a renderer 148. A menu is created in the STB 140 by processing the rendered IPG data in OSD hardware 150. The OSD hardware 150 allows the STB 140 to present visual information, e.g., the currently tuned channel number, by drawing the information on top of the received video data. The OSD hardware 150 either populates the menu with information stored in the STB 140 or requests information from the network to populate the menu. The uncompressed video signal is combined with the menu in the image combiner 155, and the result is presented by the STB 140 for display.

Since the OSD is drawn by the STB itself, cost and computational requirements often restrict OSD graphics capabilities. STBs are relatively "unintelligent" when compared to modern computer technology. The OSD capabilities of most STBs are equivalent to personal computers that are over a decade old.

Given the limited processing capabilities of most STBs, the menu generated by the OSD hardware is typically presented in a very simplistic, sluggish manner. The color palette, available fonts, object placement, and image size within the screen are also limited. Also, the OSD typically does not occupy the full display area but obscures video data beneath occupied areas. Some advanced STBs have the ability to blend the OSD with received video data instead of obscuring it, but more commonplace basic STBs do not have this ability. Thus, it is often impossible to create attractive or complicated menus (hereafter referred to as "Advanced Menus") via the STB OSD hardware.

A solution to the poor OSD presentation by conventional STBs is to use the second technique for rendering menus, i.e., send the menu as a still image from a server within the digital television network to be displayed by the STB. This technique is well adapted for a significant proportion of STBs which are not capable of scaling and relocating the barker internally. In a system including this type of STB, the barker must be decompressed, scaled to the appropriate size, moved to a position on the screen, and the remainder of the screen must be filled with a color in a server on the network. This uncompressed, transformed barker can then be compressed, transmitted to a STB, decoded at the STB, and rendered on the screen. The STB then can overwrite the portions of the screen unoccupied by the barker, utilizing OSD techniques.

Although the typical STB has limited OSD capabilities, it has excellent compression decoder functionality as it is capable of playing complex content such as high-action movies. Further, the Advanced Menus may be created in advance by any standard software program, such as Adobe® Photoshop, with almost unlimited options for colors and image locations within the screen. In using such a technique, the image is pre-rendered and then encoded for transmission to the STB. Thus, when the subscriber makes a selection from the menu screen, the next menu screen is actually an encoded image sent to the STB for display on the screen.

A problem with sending a menu screen to an STB as a still image is that STBs are typically built with a single decoder which can only handle one encoded video stream at a time. Thus, it is impossible for a STB to display an encoded still with a barker. Further, it is impossible for a STB to present multiple motion video streams simultaneously, in a "picture in picture" format.

Adding to the technical difficulties associated with combining a menu with a barker in a digital television network is the challenge of providing customized menus and content to subscribers en masse.

For an IPG to be effective in a content-on-demand delivery system, each subscriber or user must be able to navigate within the IPG without interfering with other users. In a broadcast digital television system, this implies that each user's STB must use the OSD hardware to display the IPG, since by definition broadcast content cannot be altered to display IPG content without interfering with other users. Given the limitations of OSD on deployed STBs, this results in significantly reduced visual quality for these customizations, especially when compared to broadcast content. Though it would be possible to solve this problem with customizable decoding of broadcast content in each STB, the cost and computational requirements of this and similar solutions have prevented their practical application.

Another problem is that broadcast transmission prevents individual (any) customization en masse. Although techniques have been suggested to reduce the amount of broadcast data required for specific user interface customizations, these techniques do not scale to the degree required for today's COD systems, much less to the degree envisioned for tomorrow's systems. In addition, many of these techniques require customizable decoding of broadcast content, which is not a practical solution as explained above.

Narrowcast delivery systems allow IPGs to be delivered without using OSD hardware. Narrowcast delivery networks allow different STBs to receive different content. This makes it possible to generate and send content representing an individual session for each IPG user to the STB's video decompressor. This allows IPG presentation without using OSD hardware and takes advantage of compressed video's higher picture quality to create a more attractive user experience.

In addition, narrowcast delivery systems allow individual customization of content before transmission. Since a separate session is established for each user in a narrowcast system, content delivered within each session may be customized individually for each user to deliver a personalized user experience. For example, the user's viewing preferences and history may influence the selection of targeted still images, which are also more attractively rendered, and targeted barker videos. Thus, for example, users may be presented with trailers for movies that they prefer, without having to see trailers for movies they have already seen or declined.

A challenge posed by using narrowcast delivery for menus is that individually customized content must arrive complete and compressed. This is because the STB typically has only one decoder, and for encryption and content protection purposes, the video decompressor (decoder) is typically directly connected to the display output, and the only method to alter the decompressed video image before display is to use the OSD capabilities of the STB. Therefore, individually customized content that is not processed by OSD hardware must arrive at the STB complete in compressed format. This raises the questions of when and how the customization is performed.

Customization of broadcast content, such as advertisement insertion or the watermarking of broadcast video with station logos and other information, is commonplace today. This is feasible due to the relatively small amount of broadcast content when compared to the number of viewers. For broadcast content, the same customization is delivered to all viewers, so only one set of customization equipment is required for an unlimited number of viewers, and the equipment costs can be amortized across current and future subscribers.

Theoretically, a barker could be combined with a stream, such as a still using similar equipment as used in broadcasting, such as character generators, genlocking or chroma-keying equipment. This equipment could be used, prior to subscriber requests, to take a compressed stream, render it, and replace a portion of the screen with other motion video. This is done now, for example, via chroma-keying equipment in a typical weather forecast in which a weatherman stands in front of a single-color screen to present the weather report. The live video is recorded, and the equipment renders a map with weather information behind the weatherman.

Unlike the broadcast television market where one set of equipment is capable of providing the rendering for all viewers, in the interactive television market hundreds or perhaps thousands of screens may need to be rendered either on the fly or in advance. Rendering and replacing a portion of the screen in the interactive television market would be extremely expensive and take up considerable computing power. In practice, each screen would have to be created in advance, thus removing the on-the-fly interactivity and flexibility that make digital television so desirable.

Thus, individual customization of content before compression is infeasible en masse, as it would require customization equipment for each viewer. The computational requirements of customization equipment for uncompressed video make the cost prohibitive. In addition, equipment costs are difficult or impossible to amortize across future subscribers without purchasing idle excess capacity, increasing the cost per current subscriber.

Given the difficulties of individually customizing content before compression, the combination of content required for individual customization en masse of a narrowcast application, such as an IPG, should therefore be done after compression. That is, the compressed content representations should be appropriately combined before transmission.

A brute-force method for performing this combination is to decompress the content, combine it with the narrowcast information, such as the IPG, and recompress the combined data for transmission. For example, the menu and barker could be decompressed, rendered as a combined image, recompressed, and transmitted as a recompressed combined image. However, this technique is even more computationally intensive, as each rendered screen is at least an order of magnitude larger when uncompressed, and the required bandwidth increases in direct proportion. Furthermore, this technique also requires that each screen be created in advance. Thus, performing these operations en masse in the uncompressed domain has prohibitive cost, and so this brute-force method is not a feasible option in this context.

One solution then appears to be that the combination of content must be performed upon the compressed content without requiring its decompression. This limitation implies that intimately coded details, such as quantization and prediction settings (described below), within the compressed content cannot be modified in this process.

Given the above, one might simply suggest that a compressed barker be combined with a compressed menu for display on the STB. However, this solution is unacceptable due to current compression techniques.

There are primarily two video compression techniques utilized by MPEG-2, MPEG-4 and other video streaming codecs or encoders. These two techniques may generally be referred to as quantization and prediction.

Quantization is a technique that achieves compression by reducing the precision of the values being compressed to yield a smaller quantized representation.

As an example, if the color spectrum of an image for display were represented by an integer from 0 to 99, a quantization encoder might truncate the actual value from two digits to one digit. Obviously, it would be inappropriate to rely on the $2^{nd}$ digit. Thus, the truncator (encoder) would drop the $2^{nd}$ digit, reducing the amount of information from 100 variables to 10 variables. The resulting displayed image would not be as color accurate as the original, but it would be good enough if an appropriate amount of quantization was used.

As another example, consider that the brightness of a picture element, or pixel, is represented by a value between zero and 100. For a value 56.125, which is represented by five digits and a decimal point, a smaller representation needing only two digits can be formed by dropping the fractional part, quantizing values to the nearest whole number. This quantization results in the value 56.

Quantization is referred to as "lossy" because information is irretrievably lost by quantizing a value. In the second example above, the fractional part, 0.125, is lost. Fortunately, this quantization introduces an error of at most 1%. However, excessive quantization may produce large errors from the ideal values, which are unrecoverable due to the lossy nature of this technique.

Prediction is the other technique often utilized by encoders to compress motion video. This technique achieves compression by comparing the values being compressed to values generated by a predictor and coding the difference between the predictor values and the values being compressed instead of coding the values being compressed. The success of this technique relies upon finding or making a predictor value such that the differences between the values being compressed and the predictor value have much smaller representations than the original values. Poor predictors can yield little, no, or negative compression.

As an example of this technique, consider a series of values 1.1, 1.21, and 1.4641 which are represented by 2, 3, and 5 digits (and a decimal point), respectively. These values may be compressed by using the value 1 as the predictor. The differences between the values being compressed and the predictor are 0.1, 0.21 and 0.4641, respectively. Coding this difference for each value, rather than the actual value, results in a savings of one less digit being required to represent each value. Using the value 0 as a predictor yields no difference and thus no savings. Using the value 100 as a predictor yields differences with more digits than the original values, which results in negative savings. However, if the square of the previous value is used as the predictor for the next value, then the difference for the second and third values are both zero, and at least eight digits are saved. This example illustrates the importance of finding an accurate predictor.

Unlike quantization, prediction is not an inherently lossy technique. Thus, prediction can provide vastly superior compression when compared to quantization. However, the savings resulting from quantization are reliable and easily determined. In contrast, the savings from prediction are much less reliable and deterministic; indeed, in some cases they are negative. In light of these facts, most compression algorithms use quantization and prediction, as well as other techniques such as entropy coding, to achieve compression.

When applying the prediction technique to a sequence of video frames, previous video frames often serve as good predictors of successive video frames. Video compressors perform a prediction process called motion estimation, which uses prior "reference" video frames as the basis for predicting the frame being compressed. This process typically generates motion vectors, which indicate which portions of the reference frame serve as predictors, and residual values, which are the differences between the values to be compressed and the predictors. The resulting values are typically quantized and processed further to produce the compressed output.

Generally, motion estimation is the technique of relying on the existing information to define additional information. Thus, the color of a known location in a sequence of video frames can be pointed to if that color is needed in a second location. Further, motion estimation may rely on temporal references. Thus, if there is no change to a particular location from one image to the next, the second image may simply point to the first image and replicate the first image.

Consider as an example a newscast, in which the background does not change often. In each frame, the area outside the "talking head" can point back to the prior frame. Therefore, the stream can be dramatically compressed. Likewise, if one area is a particular color, that area can be referred to by future areas, and the first area can be replicated at the second location.

A video decoder performs a complementary process called motion compensation in which the motion vectors and residual values created during motion estimation are used to reconstruct the original image for display. Note that a key differentiator between video compressors conforming to the same specification (e.g., MPEG-2) is the quality of their motion estimation, which has a direct bearing on output visual quality.

Motion estimation and compensation become problematic in combining a barker with a menu because the combination process will almost certainly change the reference values used for prediction by the compressor. This mismatch between the reference values used by the compressor and those computed by the decompressor from the received content causes image corruption, rendering the combination process unusable.

For example, consider the combination of a compressed still picture representing the full-screen background for the user interface (UI) and a motion-video barker intended to appear in the upper right-hand corner of the display. A compressed still picture is a single image, so the motion estimation and compensation cannot be performed using prior reference frames (there are none). Thus, quantization is used for compressing the still picture. In order to achieve good compression while maintaining high visual quality, the amount of quantization performed must be carefully chosen, and there is a practical lower limit to the amount of compression that is achievable.

As explained above, because video compressors accept and output only full-screen images, barkers generally contain full-screen images. However, in the combined barker-on-still, only the desired display area of the barker (commonly referred to as the barker window) changes during the barker video. The remaining portions of the screen are typically solid black.

During play-out, certain areas within the barker window may contain solid black in some places. For example, scene changes and other transitions may introduce black frames at the transition points. In these and similar cases, the motion estimation process employed by the compressor may generate motion compensation references to screen regions outside the desired display area of the barker. When the barker is combined with a still image, however, it is very unlikely that the screen regions outside the desired display area of the barker will remain solid black. This mismatch between the solid black reference values used for prediction by the compressor and the altered values computed by the decompressor from the combined barker and still picture will cause image corruption in the output displayed at the STB.

As another example, consider integration of a menu with a barker. Assume that the barker begins with multiple frames of complete black with the title of the content placed in the center of the frame and the area outside the scaled and moved barker window also being all black. An encoder utilizing motion estimation utilizes the fact that the very first pixel is black and instructs the use of this black pixel to create all the black pixels within the barker window. Thus, for example, assume that the top left corner of the screen is positioned with coordinates 0,0 and that pixel at 0,0 is black. Assume also that the barker begins at location 400,0 (assuming a standard screen of 720×420 pixels with the x coordinate first and the y coordinate second) which is also black. The encoder encoding this barker using motion estimation would simply build the bit defining the first coordinate within the barker window with a pointer to the coordinate 0,0. Furthermore, all other black pixels within the barker window would refer to coordinate 0,0. However, when the decoder renders the barker and menu via the STB on the television screen, the decoder begins by displaying the menu portion in the left hand half of the screen. Thus, if the menu was another color, perhaps blue, the barker would be rendered as blue, instead of black. This problem would then be continued and aggravated as subsequent frames of the barker would rely on that initial blue frame. Thus, the use of motion estimation within the barker window would result in a barker that was no good.

Figure 2A:
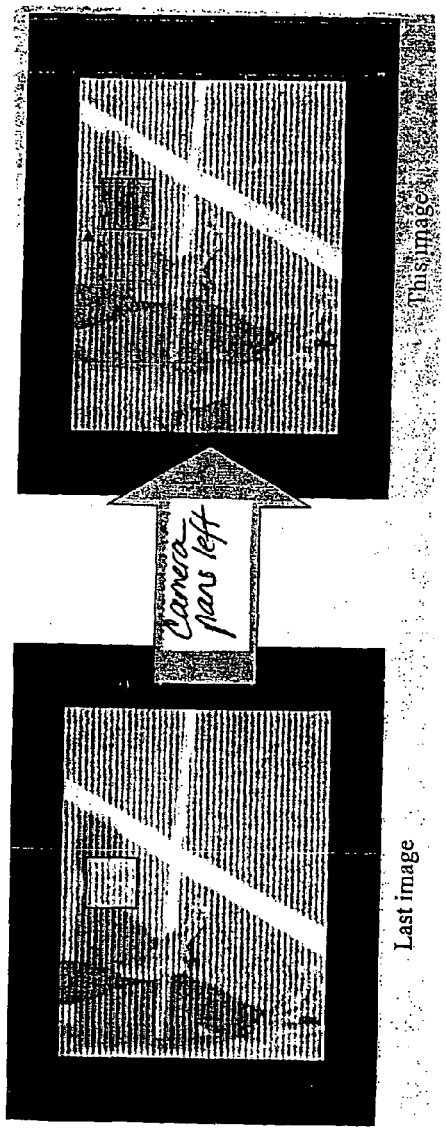
FIGS. 2A and 2B illustrate difficulties encountered in integrating images compressed using conventional compression techniques.
Figure 2B:
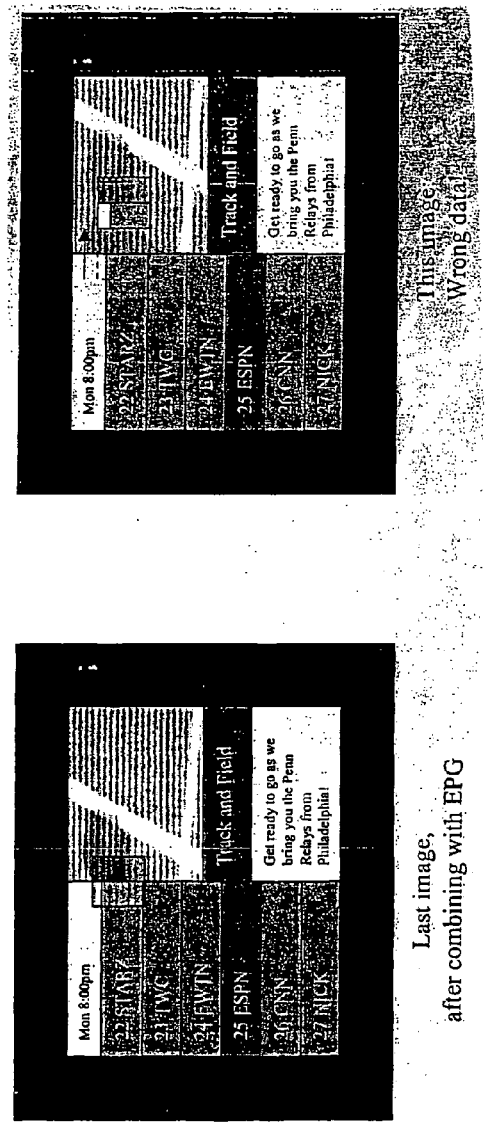

As another example, consider the application of motion compensation near the edge of a barker window, as illustrated in FIGS. 2A and 2B. In FIG. 2A, a motion video is shown, in which the camera pans left from a first frame to a second frame. FIG. 2B shows the result of decompressing a combined image containing a menu, compressed using, e.g., quantization, and the motion video, compressed using motion estimation with references to data outside the barker window. (Note: the motion video is not scaled.) As can be seen from FIG. 2B, the resulting image in the barker window appears to be complete for the first frame. For emphasis, a box has been inserted to draw attention to a particular spot, at the boundary of the barker, in the motion video. In the next frame, data in the second frame of the motion video (the area within the box) is lost, because the motion video references data from the menu instead of the correct data from the second frame of the motion video barker.

Current video compression techniques make it impossible to combine a barker stream with an Advanced Menu or motion video on the fly because using these techniques, the barker stream must be encoded to rely on motion estimation. As long as the barker encoder relies on motion estimation, the encoder will inevitably rely on information that will not exist when the barker and menu are actually rendered.

This problem of using motion estimation is further aggravated if the combined streams are both motion streams. If everything but the barker is an existing full motion video (typical picture-in-picture), it can be easily understood that a reference in at least one of the motion videos would be completely inappropriate.

A simple but inelegant solution to this problem is to disallow the use of prediction (motion estimation and compensation) when compressing the barker. However, this essentially treats the barker as a sequence of separately encoded still pictures, severely compromising compression efficiency and the resultant visual quality of the displayed output as described above.

Another solution would be to eliminate compression of the barker. However, this would either obviate any benefits from compression, resulting in a barker that was too large to be effectively streamed to the STB, or catastrophically degrade image quality.

Another solution would be to encode the barker stream without motion estimation, using each frame as an I-frame that is independent from other frames. Each single frame of the barker can be treated separately and encoded into an I frame using quantization and other techniques, such as variable-length coding, instead of prediction. However, the compressor ratio required for motion video is so high that quantization without prediction would invariably cause noticeable degradation in resultant image quality.

For example, consider one second's worth of standard definition NTSC frames (roughly 29.97 frames) at full resolution (720×480 pixels, with 24-bit color resolution). Uncompressed at full resolution, each frame would be represented by 8,294,440 bits (720×480×24 bits per pixel). For one second's worth of frames, the bit rate would need to be 248,583,168 bits per second. However, the bit rate for digital cable broadcast is typically between 2,000,000 and 6,000,000 bits per second. This means that compression ratios from 120:1 to 40:1 would be needed to achieve the appropriate bit rate. To achieve such high compression ratios without using predictive techniques, image quality would have to be sacrificed.

According to exemplary embodiments, a solution to the aforementioned problems is to constrain the prediction process used during compression to preclude the use of information outside a restricted region and use instead only information included within a desired region. Using this solution, a compressed image is formed, restricted to the desired region of the image area, by representing a segment of the image within the desired region with a reference to another segment of the image within the desired region.

For example, in compressing a barker according to an exemplary embodiment, the encoder is prohibited from using any information located outside the barker window or motion video window being encoded when performing motion estimation. This eliminates the possibility of undesirable motion compensation references that may cause image corruption when combined with other content but still allows the use of motion estimation and compensation to yield sizable compression benefits.

To understand this concept, consider again the example of a barker on still with Advanced Menus. The barker motion video must be scaled and positioned as desired. Then, when compressing the barker, if the motion estimation is restricted to consider only those locations fully contained within the barker window during barker compression, this prohibits any motion compensation references to areas outside the barker window in the output from being combined with the background still image. Since the still image does not utilize motion compensation, it is unnecessary to encode the still image in any different manner.

According to an exemplary embodiment, if the barker is to reside over a full motion video (picture-in-picture), the previously scaled and positioned barker is encoded without relying on any information outside the barker window, and the underlying motion video is encoded without relying on any information within the barker window. Therefore, the alteration of the data outside the barker window is immaterial for the barker, image corruption will not occur, and the combined output can be displayed properly at the STB.

FIG. 3 illustrates an exemplary system for creating an integrated image according to exemplary embodiments. A first image, such as a barker, is generated in a first image source 310a, and a second image, such as a menu, is generated in a second image source 310b. The first image is compressed by an encoder 320, using the restrictive region technique described above. The encoder may be implemented with hardware, software, or a combination of both. For example, the encoder may be implemented with an ASIC specially designed to carry out the restrictive region motion estimation compression technique or software running on a microprocessor using custom hardware acceleration modules for motion estimation (the microprocessor and modules being included, e.g., in an ASIC).

Although not illustrated, the second image may also be compressed by an encoder. For the second image, assuming it is a still menu image, quantization may be used as the compression technique. If the second image is a motion video, the restrictive region motion estimation technique described above may be used.

The compressed first image and the second image (which may or may not be compressed) are delivered to an image combiner via connections 330a and 330b. The image combiner 340 combines the first compressed image and the second (compressed/uncompressed) image by cutting and pasting portions of the images into in integrated image.

If the second image arrives at the image combiner 340 compressed, the combiner 340 selects portions of the first compressed image that are to be included in the integrated image, selects portions of the second compressed image that are to be included in the integrated image, and pastes the selected portions into a resultant compressed image. For example, if the first compressed image includes a scaled and repositioned barker, the combiner selects portions of the first image within the barker window. If the second compressed image includes a compressed still image, the combiner selects portions of the second image that correspond to the portions of the still image that are to be included in the integrated image.

As an illustrative example, assume that the first image and the second image are MPEG-2 video compressed images containing rows or slices, each slice containing contiguous macroblocks (16×16 pixels). The combiner 340 selects appropriate portions of slices from the first and second images and combines the portions by interleaving the data to produce the integrated image.

If the second image arrives at the image combiner 340 uncompressed, the combiner 340 may perform compression using, e.g., the restrictive region motion estimation technique. The compressed images are then combined by the combiner 340 by, e.g., selecting portions of the compressed images and combining the selected portions as described above.

The combiner 340 may be implemented with hardware, software, or a combination of both. For example, the encoder may be implemented with an ASIC specially designed to perform the selective cutting and pasting or software running on a microprocessor for performing the selective cutting and pasting.

The integrated image is output via a connection 350 for further processing (e.g., decoding) and display.

Those skilled in the art will appreciate that minor alterations may be needed when combining the first and second compressed images to compensate for differences in encoding contexts at boundary points of the first and second images. Ideally, the encoding context is the same for both images at these boundary points.

As an alternative to the selective cutting and pasting of the first and second compressed images, the combiner 340 may simply insert the second compressed image into the compressed output at the appropriate location within the first compressed image. This approach works best if the portions in the first compressed image that are being replaced are harmlessly coded to effect no operation, i.e., there is no change from the corresponding portions of the first image previously displayed upon decompression. In MPEG-2 video compression, for example, this harmless coding may use skipped or zero-motion macroblocks, and appropriate locations may lie at points between the compressed data representing each picture. It may prove advantageous or expedient to remove portions of the first compressed image to make space for the insertion, so long as the removed portions are carefully chosen to have minimal impact on the final quality of the resultant integrated image.

Although not specified in FIG. 3, it will be appreciated that the image encoder and the image combiner may be included within different components of a content-on-demand network. For example, the image encoder 320 may be included at a content provider, on a server within the content-on-demand network, or even at the set top box. Also, the image combiner 340 may be included at the content provider, on a network server, or at the set top box. Further, although shown as separate components, the image encoder 320 and the image combiner 340 may be incorporated or replicated in one device.

The connections 330a, 330b and 350 depicted in FIG. 3 represent a variety of paths by which signals may be delivered from one component to the next, depending on where the various components are located.

In addition, although the system depicted in FIG. 3 shows only the path of images in the direction from image sources for simplicity of illustration, it will be appreciated that signals also flow towards the image sources, e.g., for requesting content.

Using a system such as that depicted in FIG. 3, high quality electronic programming guides with integrated video clips may be presented to users in a digital networking environment. Using the programming guide with integrated video clips, a user can, e.g., request more information regarding a particular movie. In response, the viewer may be presented with a summary of the movie as well as a video clip with some movie highlights. This will allow the viewer to more accurately assess his or her interest in the movie. The summary information and the video clip presented may be high resolution images, allowing the viewer to experience a video clip without sacrificing resolution.

FIGS. 4A and 4B illustrate in detail exemplary systems for creating integrated images according to exemplary embodiments. In FIG. 4A, the image combiner is included in a server in the content-on-demand network. In FIG. 4B, the image combiner is included in the set top box.

FIG. 4A depicts an exemplary system for creating an integrated digital image containing, e.g., a barker and an Advanced Menu. In the system shown in FIG. 4A, a first image source 410a within a content provider 415a provides a digital barker. A menu source 410b within an on-demand menu generator 415b provides a digital IPG menu. The content provider 415a and the menu generator 415b include encoders 420a and 420b, for scaling, positioning, and compressing the barker and compressing the menu image. The encoding performed by the encoder 420a adheres to the restrictive region motion estimation compression technique described above. The encoder 420b may use quantization to compress the menu (assuming the menu is a still image). If the menu were, instead, a motion video, the encoder 420b could use the restrictive region compression technique.

The compressed images are transmitted to a network server 425 via connections 430a and 430b. The connections 430a and 430b may be any conventional network connection, e.g., a satellite connection or a gigabit (GigE) class optical connection.

Although not illustrated in FIG. 4A, it will be appreciated that the content provider 410a and the on-demand menu generator 415b may contain other components for preparing the barker and the menu. For example, for a digital cable system using GigE output as the connection to the network server, the barker may be formatted into, e.g., MPEG-2 transport stream packets, multiplexed with audio if applicable, stuffed into the payload of IP packs, and then sent over the GigE network.

At the network server 425, the images may be stored in a buffer 435 and then combined in an image combiner 430a. Although omitted for simplifying the illustration, it will be appreciated that additional processing of the images may also occur at a network server, before combination by the image combiner 440. For example, if the images were received as IP packets, the packets may be unloaded here, and the images may be remultiplexed with other programs, QAM modulated, and up converted. In addition, the images may be scaled and repositioned at the network server.

The combined image may then be streamed to STBs via a distribution network (not shown here to simplify the illustration). The STBs may process the image in a conventional manner for display.

FIG. 4B depicts an exemplary system for creating an integrated image containing, e.g., a barker and another image. In FIG. 4B, the first image from an analog broadcast source 410c in a broadcast source 415c is converted into digital form (via an encoder 420 or in a separate A/D converter) and compressed in the encoder 420 using restrictive region motion compensation technique. Although not shown, it will be appreciated that the source 415c may include additional components for processing the image, such as components for formatting, multiplexing and IP packet pay loading. The compressed digital image is transmitted via the content delivery network 430c to an STB 445. The content delivery network 430c may be one of many types such as cable with, e.g., a head end, a distribution network, and RF cable connections, or satellite or DSL.

A second analog image from an analog broadcast source 410d is converted into digital form, e.g., at the source 410d, and transmitted (without compression) via the same network or a different delivery network 430d to the STB 445. An example of an image that need not be compressed before combination with the first image is an NTSC image. Though an NTSC signal is encoded in an NTSC format, it is not compressed in the MPEG-2 video format. Thus, for purposes of this description, this type of signal may be considered "uncompressed".

In the STB 445, the compressed barker is processed, e.g., received by RF tuner 442a and demodulated in a QAM Demodulator 443, respectively. Although not shown, additional processing, such as demultiplexing, depacketizing, and scaling/repositioning of the barker may also be performed in the STB 445. The other image is also processed in the STB 445, e.g., received in an RF tuner 442b and converted to digital form via a converter 444. Although not shown, the second image may also be further processed, e.g., decoded in an NTSC signal decoder. The barker and the second image are then combined in an image combiner 440b. The combiner 440b may include encoding components for compressing the second image if necessary, using the restrictive region technique, prior to the combination. The combined image is then output for display via, e.g., a television.

Although not illustrated in FIG. 4A or FIG. 4B, it will be appreciated that the image combiner may also be included at the content provider or digital broadcast source. Also, although the image sources and encoders are illustrated as being distinct for the different images, it will be appreciated that images that are to be combined may originate from the same image source and may be compressed within the same encoder.

Figure 5A:
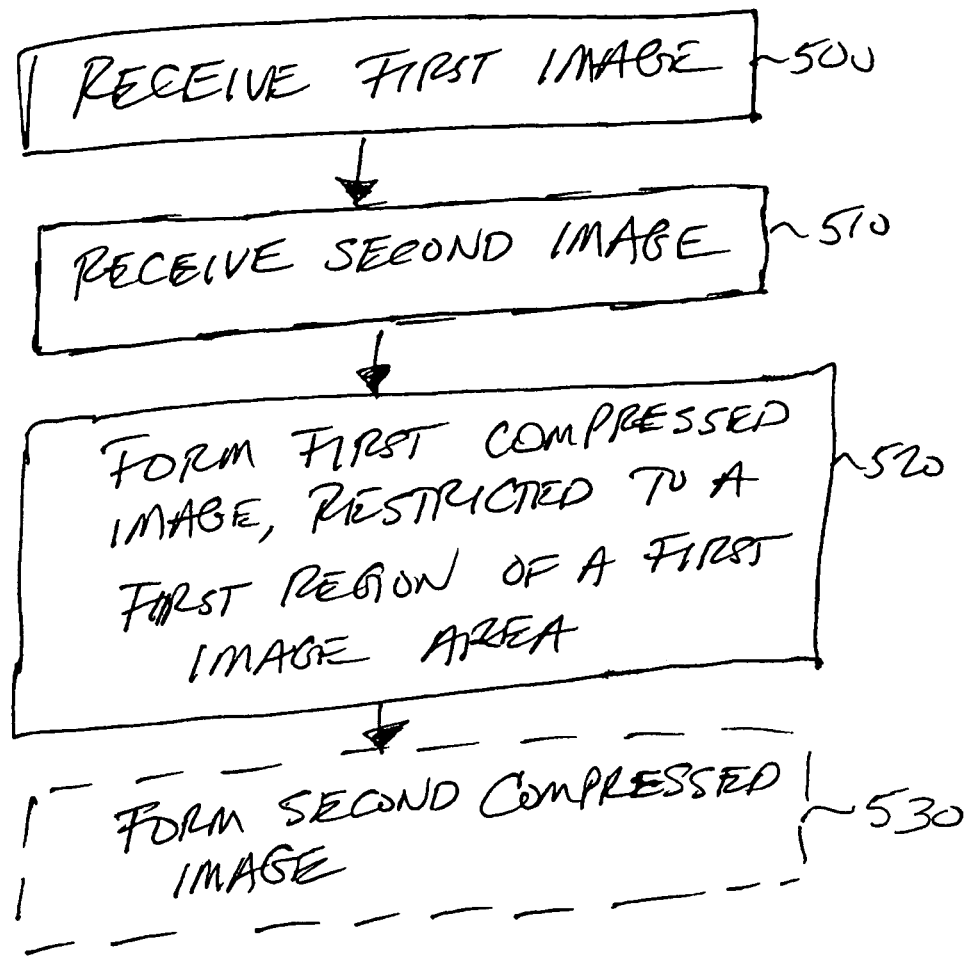
FIGS. 5A and 5B illustrates exemplary steps in a method for preparing images for integration and combining the images to form an integrated image according exemplary embodiments.

FIG. 5A illustrates an exemplary method preparing first and second images for integration. The method begins at step 500 at which a first image is received. At step 510, a second image is received. At step 520, a first compressed image is formed, restricted to a first region of a first image area. The first image area may span one or multiple frames, logically or physically divided into segments. The first compressed image may thus be formed by referencing information in the first region within the same frame or within a different frame. If the first image is a barker, the first region may be a barker window.

At step 530, a second compressed image is formed (if necessary). The second compressed image may be formed using quantization, prediction or some other compression technique, as long as the compression parameters and/or prediction references are not incompatible with the first compressed image.

According to an exemplary embodiment, the second compressed image may be formed by restricting the second compressed image to a particular region of a second image area. The second image area may be the same as or different from the first image area. Also, the second image area may span one or multiple frames, logically divided into segments. Thus, the second compressed image may be formed by referencing information in a second region within the same frame or within a different frame. If the second image is a motion video, the second region may correspond to a portion of the frame(s) in which the motion video is to be shown.

Step 530 is shown with dotted lines because it is not always necessary to compress the second image in preparation for integration.

Figure 5B:
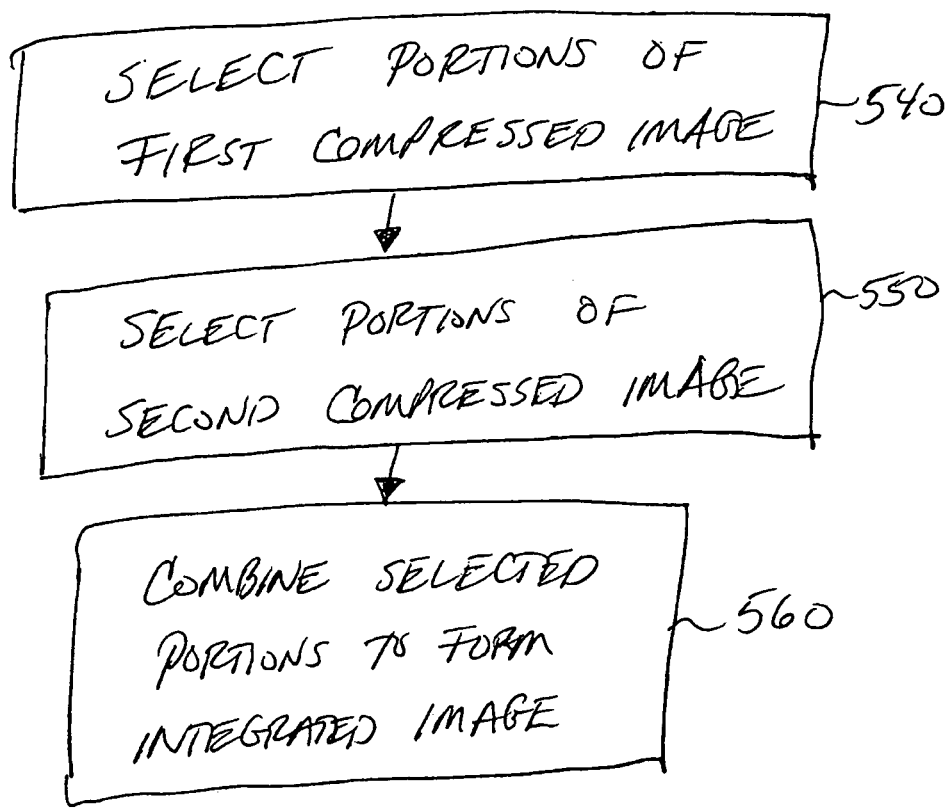

After being compressed, the first image is ready for integration with the second image as shown in FIG. 5B.

The exemplary integration process shown in FIG. 5B begins with selecting portions of the first compressed image within the first region of the first image area at step 540. At step 550, portions of the second compressed image are selected. If the second compressed image was formed using the restrictive region technique, portions of the second compressed image within the second portions of the second image area are selected.

Although not illustrated, the integration process may include a step for compressing the second image if necessary, e.g., if the second image was not previously compressed at step 530.

At step 560, the selected portions of the first compressed image are combined with the selected portions of the second compressed image.

FIGS. 6A-6D illustrate examples of displayed images that may result from integrating images compressed as described above. It should be appreciated that in order to integrate images and present them as shown in these figures, an STB must be capable of scaling and repositioning. Otherwise, the integration would need to occur before the images reach the STB, e.g., at a server within the delivery network.

Figure 6C:
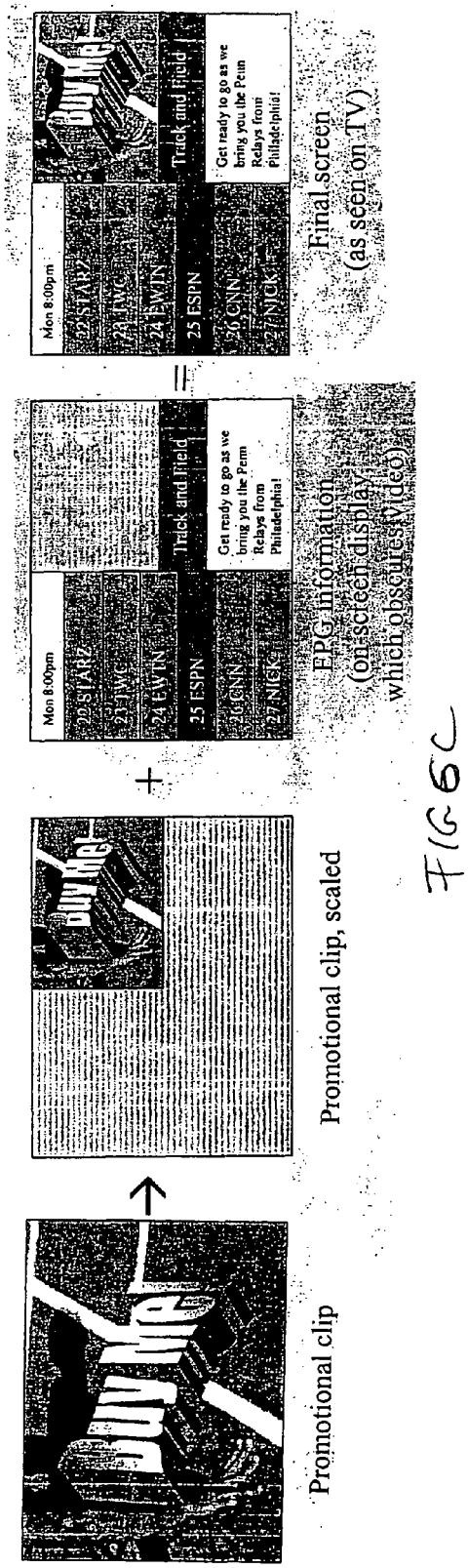
FIG. 6C illustrates a promotional motion video barker scaled and combined with the menu.
Figure 6D:
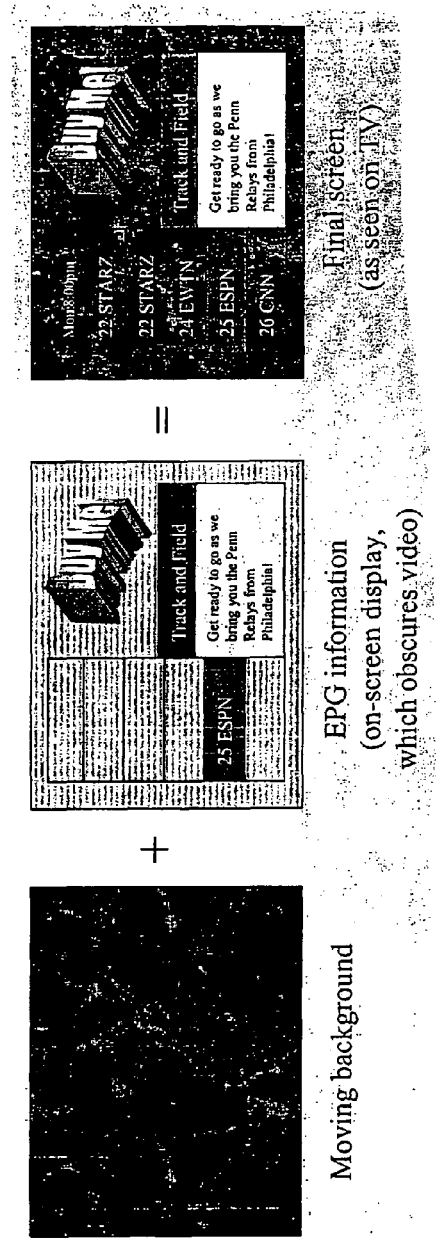
FIG. 6D illustrates a moving background image is combined with a menu.

In FIG. 6A, a motion video received on the currently tuned channel is combined with on-screen menu information such that in the final screen the menu appears to be "superimposed" on the motion video. In FIG. 6B, the motion video received on the currently tuned channel is scaled and then combined with a menu, including on screen channel information. The result in the final screen is that the motion video is shown in the top right corner of the screen, with the menu taking up the rest of the screen. Similarly, in FIG. 6C, a promotional motion video barker is scaled and combined with the menu that includes on screen channel information. The final screen shows the promotional video in the upper right hand corner of the screen, with the menu taking up the rest of the screen. In FIG. 6D, a moving background image is combined with a menu including on-screen channel information and a promotion, and the final screen shows a menu including the on screen channel information and the promotion "superimposed" on the background image.

Although in the examples described above, integration of a first image and a second image is discussed, the invention may be applied to a conceptually unlimited number of images and windows (regions) as long as each window being encoded does not rely on information outside the location of the window being encoded.

In addition, picture-in-picture (PIP) functionality can be provided in a similar fashion to that described above by restricting motion estimation to the portion of the screen excluding the inset picture window for the full-screen background video content and to the portion of the screen excluding to the insert picture window for the inset video content. Each compressed video sequence will not contain motion compensation references outside its desired display area, and thus motion compensation issues will not preclude the combination of this content.

This solution can clearly be expanded to an arbitrary and unlimited number of content items to provide features such as multiple PIP, provided that motion estimation is restricted to the proper areas for each content item during compression.

This solution can be expanded by interpreting the term "image area" to have not only a spatial component (e.g., "desired display area") but also a temporal component. This would be appropriate for schemes that do not have fixed reference frame assignments as MPEG-2 video compression does (e.g., MPEG-4 or H.264 video), and for uses where the display rate is to be altered. For example, this might be appropriate for adapting content for STB at television display rate for a portable device with limited display rates.

This solution can also be expanded to encompass prediction techniques other than motion estimation and compensation. For example, a texture-based compression technique could be constrained to use only certain portions of textures that will remain after combination, and unused portions and textures could be eliminated; a dictionary-based compression technique could be constrained to use only portions of the dictionary that would be available after combination, and the unused portions of the dictionary could be omitted from transmission.

It should be understood that the foregoing description and accompanying drawings are by example only. A variety of modifications are envisioned that do not depart from the scope and spirit of the invention.

The above description is intended by way of example only and is not intended to limit the present invention in any way.

What is claimed is:

1. A method for preparing at least a first image for integration with at least a second image, comprising:
   receiving at least the first image, and where the first image comprises an analog image, converting the analog image to a digital image; and
   forming a first compressed image from a first part of the first image by representing at least one segment of the first image within the first part with a reference to another segment of the first image within the first part and precluding compression of a second part of the first image, the first part and the second part different, non-overlapping parts of the first image, thereby preparing the first compressed image for integration with at least the second image.

2. The method of claim 1, further comprising preparing at least the second image for integration with at least the first image by:
   receiving at least the second image, and where the second image comprises an analog image, converting the analog image to a second digital image; and
   forming a second compressed image.

3. The method of claim 2, wherein the second compressed image is formed from a portion of a second image area by representing at least one segment of the second image within the portion with a reference to another segment of the second image within the portion, thereby preparing the second compressed image for integration with the first compressed image.

4. The method of claim 3, wherein the portion comprises one or more slices of the second image.

5. The method of claim 3, further comprising combining the first compressed image and the second compressed image by interleaving the first part and the portion.

6. The method of claim 3, wherein the second image area spans at least one frame, and the step of forming the second compressed image includes representing at least one segment of the second image within the portion of the frame with a reference to another segment of the second image within the portion of the frame.

7. The method of claim 3, wherein the second image area spans multiple frames, and step of forming the second compressed image includes representing at least one segment of the second image within the portion of one frame with a reference to a segment of the second image within the portion of a different frame.

8. The method of claim 1, wherein the first part comprises one or more slices of the first image.

9. The method of claim 1, wherein at least one of the first image or the second image includes at least one frame.

10. The method of claim 1, wherein the first part spans at least one frame, and the step of forming the first compressed image includes representing at least one segment of the first image within the first part of the at least one frame with a reference to another segment of the first image within the first part the at least one frame.

11. The method of claim 1, wherein the first part spans multiple frames, and the step of forming the first compressed image includes representing at least one segment of the first image within the first part of one frame with a reference to a segment of the first image within the first part of a different frame.

12. The method of claim 1, wherein the first image includes a still image, and the second image includes a motion video image, a still image, or a combination of both.

13. The method of claim 12, wherein the first image is a barker.

14. The method of claim 12, wherein the second image is a menu or programming guide.

15. The method of claim 1, wherein at least the first image is prepared for integration with at least the second image for display to a content-on-demand subscriber.

16. The method of claim 1, wherein the first compressed image is combined with the second image to form an integrated image.

17. An apparatus for preparing at least a first image for integration with at least a second image comprising:
   an input for receiving at least the first image, and where the first image is an analog image, for converting the analog image to a digital image; and
   an encoder for forming a first compressed image from a first part by representing at least one segment of the first image within the first part with a reference to another segment of the first image within the first part and precluding compression of a second part of the first image, the first part and the second part different, non-overlapping parts of the first image, thereby preparing the first compressed image for integration with at least the second image.

18. The apparatus of claim 17, further comprising an input for receiving at least the second image, wherein the encoder forms a second compressed image.

19. The apparatus of claim 18, wherein the second compressed image is formed from a portion of a second image area by representing at least one segment of the second image within the portion with a reference to another segment of the second image within the portion, thereby preparing the second compressed image for integration with the first compressed image.

20. The apparatus of claim 19, wherein the first image area and the second image area are the same, and the first part and the portion are different regions within the same image area.

21. The apparatus of claim 19, wherein the first image area and the second image area are different, and the first part and the portion are different regions within different image areas.

22. The apparatus of claim 19, wherein the second image is logically or physically divided into slices.

23. The apparatus of claim 22, wherein the first compressed image is combined with the second compressed image by interleaving.

24. The apparatus of claim 19, wherein the second image area spans at least one frame, and the encoder forms the second compressed image by representing at least one segment of the second image within the portion of the frame with a reference to another segment of the second image within the portion of the frame.

25. The apparatus of claim 19, wherein the second image area spans multiple frames, and the encoder forms the second compressed image by representing at least one segment of the second image within the portion of one frame with a reference to a segment of the second image within the portion of a different frame.

26. The apparatus of claim 17, wherein the first image is logically or physically divided into slices.

27. The apparatus of claim 17, wherein one or more of the first image or the second image includes at least one frame.

28. The apparatus of claim 17, wherein the first part spans at least one frame, and the encoder forms the first compressed image by representing at least one segment of the first image within the first part of the at least one frame with a reference to another segment of the first image within the first part of the at least one frame.

29. The apparatus of claim 17, wherein the first part spans multiple frames, and the encoder forms the first compressed image by representing at least one segment of the first image within the first part of one frame with a reference to a segment of the first image within the first part of a different frame.

30. The apparatus of claim 17, wherein the first image is a motion video image, and the second image is a still image, a motion video image, or a combination of both.

31. The apparatus of claim 30, wherein the first image is a barker.

32. The apparatus of claim 30, wherein the second image is a menu or programming guide.

33. The apparatus of claim 17, wherein at least the first image is prepared for integration with at least the second image for display to a content-on-demand subscriber.

34. The apparatus of claim 17, wherein the first compressed image is combined with the second image to form an integrated image by interleaving the first image with the second image.

35. A system for preparing at least a first image, wherein the first image is a digital image, for integration with at least a second image, comprising:
 a receiver for receiving at least the first image; and
 at least a first encoder for forming a first compressed image from a first part by representing at least one segment of the first image within the first part with a reference to another segment of the first image within the first part and precluding compression of a second part of the first image, the first part and the second part different, non-overlapping parts of the first image, thereby preparing the first compressed image for integration with the second image.

36. The system of claim 35, further comprising:
 a receiver for receiving at least a second image; and
 at least a second encoder for forming a second compressed image, thereby preparing the second image for integration with the first image.

37. The system of claim 36, wherein the second encoder forms the second compressed image from a portion of a second image area by representing at least one segment of the second image within the portion with a reference to another segment of the second image within the portion.

38. The system of claim 37, wherein the first image area and the second image area are the same, and the first part and the portion are different regions within the same image area.

39. The system of claim 37, wherein the first image area and the second image area are different, and the first part and the portion are different regions within different image areas.

40. The system of claim 37, wherein the second image is logically or physically divided into segments.

41. The system of claim 37, wherein the second image area spans at least one frame, and the second encoder forms the second compressed image by representing at least one segment of the second image within the portion of the frame with a reference to another segment of the second image within the portion of the frame.

42. The system of claim 37, wherein the second image area spans multiple frames, and the second encoder forms the second compressed image by representing at least one segment of the second image within the portion of one frame with a reference to a segment of the second image within the portion of a different frame.

43. The system of claim 35, wherein the first image is logically or physically divided into segments.

44. The system of claim 35, wherein the first image includes at least one frame.

45. The system of claim 35, wherein the second image includes at least one frame.

46. The system of claim 35, wherein the first part spans at least one frame, and the first encoder forms the first compressed image by representing at least one segment of the first image within the first part of the at least one frame with a reference to another segment of the first image within the first part of the at least one frame.

47. The system of claim 35, wherein the first part spans multiple frames, and the first encoder forms the first compressed image by representing at least one segment of the first image within the first part of one frame with a reference to a segment of the first image within the first part of a different frame.

48. The system of claim 35, wherein the first image is a motion video image, and the second image is a still image, a motion video image, or a combination of both.

49. The system of claim 48, wherein the first image is a barker.

50. The system of claim 48, wherein the second image is a menu or programming guide.

51. The system of claim 35, wherein the first image is prepared for integration with at least the second image for display to a content-on-demand subscriber.

52. The system of claim 35, wherein the first compressed image is combined with the second image to form an integrated image.

53. A method for integrating at least a first image, wherein the first image comprises a digital image, with at least a second image, wherein the second image comprises a digital image, comprising:
 forming a first compressed image from a first part of the first image by representing at least one segment of the first digital image within the first part with a reference to another segment of the first digital image within the first part and precluding compression of a second part of the first image where the first part and the second part are different non-overlapping parts of the first image; and
 combining the first compressed image with the second image to form an integrated image.

54. The method of claim 53, further comprising forming a second compressed image, wherein the step of combining combines the second compressed image with the first compressed image.

55. The method of claim 54, wherein the second compressed image is formed, restricted to a portion of a second image area, by representing at least one segment of the second image within the portion with a reference to another segment of the second image within the portion.

56. The method of claim 55, wherein the step of combining comprises selecting first portions of the first compressed image within the first part, selecting second portions of the second compressed image within the portion, and combining the selected first portions and second portions.

57. An apparatus for integrating at least a first image and at least a second image comprising:
 an encoder for forming a first compressed image from a first part of the first image by representing at least one segment of the first image within the first part with a reference to another segment of the first image within the first part and precluding compression of a second part of the first image, the first part and the second part different and non-overlapping parts of the first image; and
 a combiner for combining the first compressed image and the second image to form an integrated image.

58. The apparatus of claim 57, wherein the encoder forms a second compressed image, and the combiner combines the second compressed image with the first compressed image.

59. The apparatus of claim 58, wherein the second compressed image is formed from a portion of a second image area, by representing at least one segment of the second image within the portion with a reference to another segment of the second image within the portion.

60. The apparatus of claim 59, wherein the combiner selects first portions of the first compressed image within the first part, selects second portions of the second compressed image within the portion, and combines the selected first portions and second portions.

61. A system for integrating at least a first image and at least a second image, comprising:
- at least a first encoder for receiving the first image and forming a first compressed image from a first part of the first image by representing at least one segment of the first image within the first part with a reference to another segment of the first image within the first part and precluding compression of a second part of the first image, the first part and the second part different and non-overlapping parts of the first image; and
- a combiner for combining the first compressed image with the second image to form an integrated image.

62. The system of claim 61, further comprising:
- at least a second encoder for receiving the second image and forming a second compressed image, wherein the combiner combines the first compressed image and the second compressed image.

63. The system of claim 62, wherein the second encoder forms the second compressed image from a portion of a second image area, by representing at least one segment of the second image within the portion with a reference to another segment of the second image within the portion.

64. The system of claim 63, wherein the combiner selects first portions of the first compressed image within the first part, selects second portions of the second compressed image within the portion, and combines the selected first portions and second portions.

* * * * *